United States Patent [15] 3,665,102

Townsend et al. [45] May 23, 1972

[54] X-Y COORDINATE LOCATOR

[72] Inventors: Vernon R. Townsend, Greenbelt; Waldo M. Womeldorf, Hyattsville, both of Md.

[73] Assignee: The Singer Company, New York, N.Y.

[22] Filed: Nov. 12, 1969

[21] Appl. No.: 876,009

[52] U.S. Cl. ..........178/18
[51] Int. Cl. ..........H04n 1/00
[58] Field of Search ..........178/18, 19, 20, 17 D

[56] References Cited

UNITED STATES PATENTS

| | | | |
|---|---|---|---|
| 3,379,835 | 4/1968 | Gilbert | 178/18 |
| 3,379,834 | 4/1968 | Conners | 178/18 |
| 3,355,730 | 11/1967 | Neasham | 340/286 |
| 3,022,501 | 2/1962 | Seigle | 178/18 |

*Primary Examiner*—Kathleen H. Claffy
*Assistant Examiner*—Horst F. Brauner
*Attorney*—Francis L. Masselle, William Grobman and Andrew G. Pullos

[57] ABSTRACT

This device is a semiautomatic locator of any particular point on a surface by means of its X–Y coordinates. There are many situations where it is desirable to located a particular point on a large surface when only the X–Y coordinates of the point with respect to a datum are known. On a large surface, equipment of this type is necessary. This device comprises a support for the surface in question, two carriages, one movable along the X axis and the other along the Y axis, and electrical contacts on each carriage which cooperate with brushes on the carriages and are connected to registers to cause the registers to identify the X and the Y position of a pointer on the carriages at every instant. When the X-Y address of the point is registered, the pointer identifies that point on the surface.

3 Claims, 2 Drawing Figures

Patented May 23, 1972 3,665,102

2 Sheets-Sheet 1

INVENTOR.
VERNON R. TOWNSEND
WALDO M. WOMELDORF

BY

William Grolman

Patented May 23, 1972

3,665,102

2 Sheets-Sheet 2

INVENTOR
VERNON R. TOWNSEND
WALDO M. WOMELDORF
BY
William Grobman

X-Y COORDINATE LOCATOR

This invention relates to point locating devices and, in particular to a semiautomatic system for easily and rapidly locating a particular, on a surface by its X–Y address.

There are many situations where it is desirable to be able to locate a particular point on a large surface with rapidity and accuracy. One such situation which is quite common is the problem of trying to locate a city on a large map. Most road maps and the like have indices along their edges which identify the locations of cities and towns on the map by X–Y coordinates. However, the coordinates used are rather coarse, and after the coordinate address is determined, there usually follows a search within the neighborhood of the address for the location of the city in question. This further search often requires a substantial time. Although this situation is well known to most persons, the time available for the search is usually no problem and the number of such searches to be made is usually small. However, consider the problem of locating a large number of separate and randomly spaced points such as on a large aerial photograph, or a large terminal contact panel which carries a large number of printed circuit cards. Even though the location of each point to be found on the photograph or the terminal to be wired on the panel is known, the physical task of following the coordinate lines to their intersections is tedious, requires a large amount of time, and leads to errors. A device which identifies each such point rapidly and accurately is required. This invention provides such a device.

It is an object of this invention to provide a new and improved locating device.

It is another object of this invention to provide a new and improved device for locating individual points on a surface containing many points.

It is a further object of this invention to provide new and improved apparatus for readily and semiautomatically indicating desired points on a surface by the use of its rectangular coordinates.

It is still another object of this invention to provide new and improved apparatus which utilizes an address comprising rectangular coordinates for indicating the location on a large surface of a particular point.

Other objects and advantages of this invention will become apparent from the following description which should be considered together with the accompanying drawings, in which.

Figure 1:
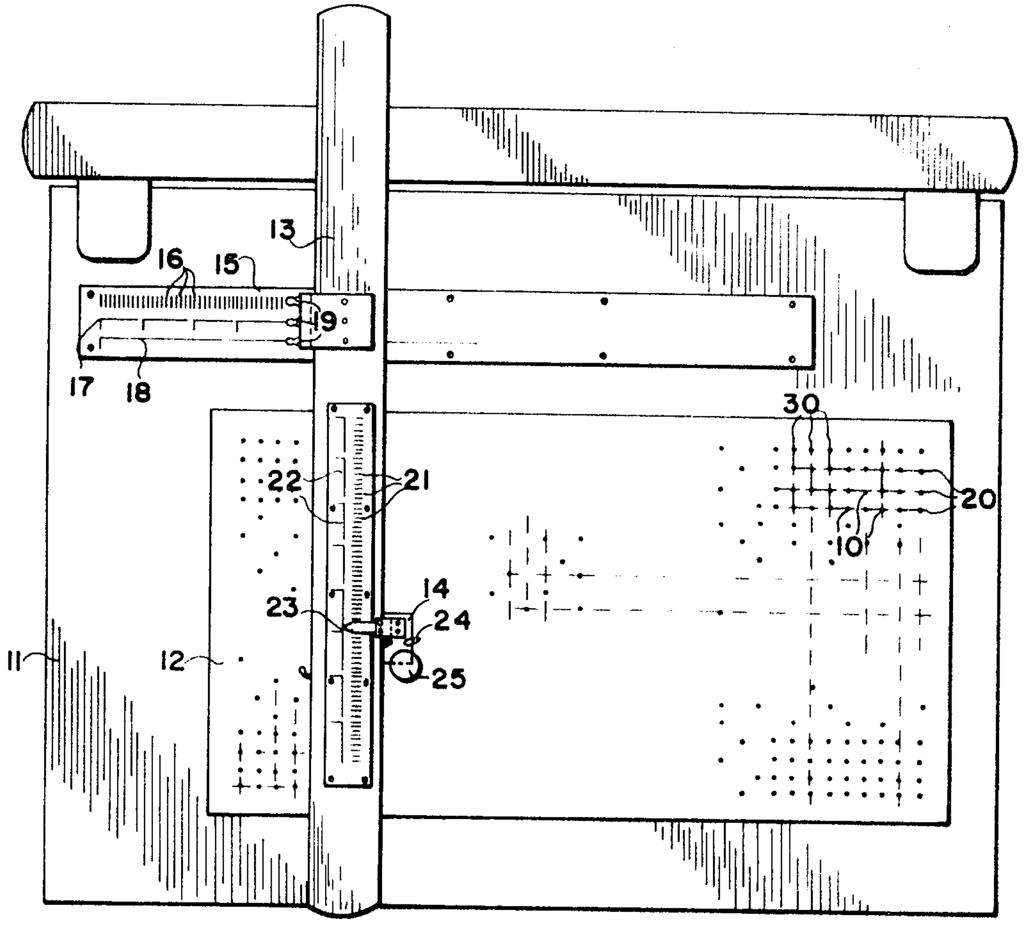
FIG. 1 is a plan view of the apparatus of this invention.

Referring to the drawings in detail, and more particularly to FIG. 1, the reference character 11 designates a support such as a table, easel, or the like upon which a surface 12 is supported. The surface 12 comprises a large number of individual points or locations 10, some of which are indicated by the intersection of horizontal lines 20 and vertical lines 30. The table 12 carries a first carriage 13 which is disposed vertically on the table 12 and which is mounted to be horizontally movable thereon. The carriage 13 has a second carriage 14 movably mounted thereon to move in a vertical direction. Also mounted on the table 12 is a strip 15 of electrically insulating material upon which electrical contacts 16, 17, and 18 are disposed. A member 19 is fixedly mounted on the carriage 13 and carries fingers or brushes 19. The carriage 13 also carries an insulating strip 21 upon which electrical contacts 22 and 23 are disposed. A pair of fingers, mounted so that only one can be shown in FIG. 1, is carried by the carriage 14 which also carries a pointer 24 for indicating the desired point on the surface 12 and a handle 25 by which the carriages 13 and 14 may be moved.

In operation, the surface 12 is mounted upon the table 11 by any suitable means such as clamps, screws, etc. For proper operation of the apparatus, the surface 12 must be positioned on the table 11 so that the zero points in both the X and Y coordinates are properly positioned with respect to the carriages 13 and 14. An address of the first point to be located is made available by any suitable means and is located on the surface 12 by moving the carriage 13 horizontally until the point 24 indicates the correct Y coordinate and by moving the carriage 14 until the pointer 24 also indicates the proper X coordinate. The pointer 24 then indicates the desired point on the surface 12. Not shown, but of considerable value, are locks for the two carriages 13 and 14 so that once either carriage is positioned at the desired coordinate, it can be locked in place while the other carriage is moved. Although not shown in FIG. 1, the electrical contacts 16, 17, and 18 mounted on the table 11 and contacts 21 and 22 mounted on the carriage 13 are individually connected to an electrically controlled indicator. The fingers 19 carried by the carriage 13 and fingers 23 carried by the carriage 14 are connected to a source of electrical energy so that the position of the fingers 19, for example, is indicated electrically by a bank of electrically controlled indicators, and the same is true for the fingers 23.

Figure 2:
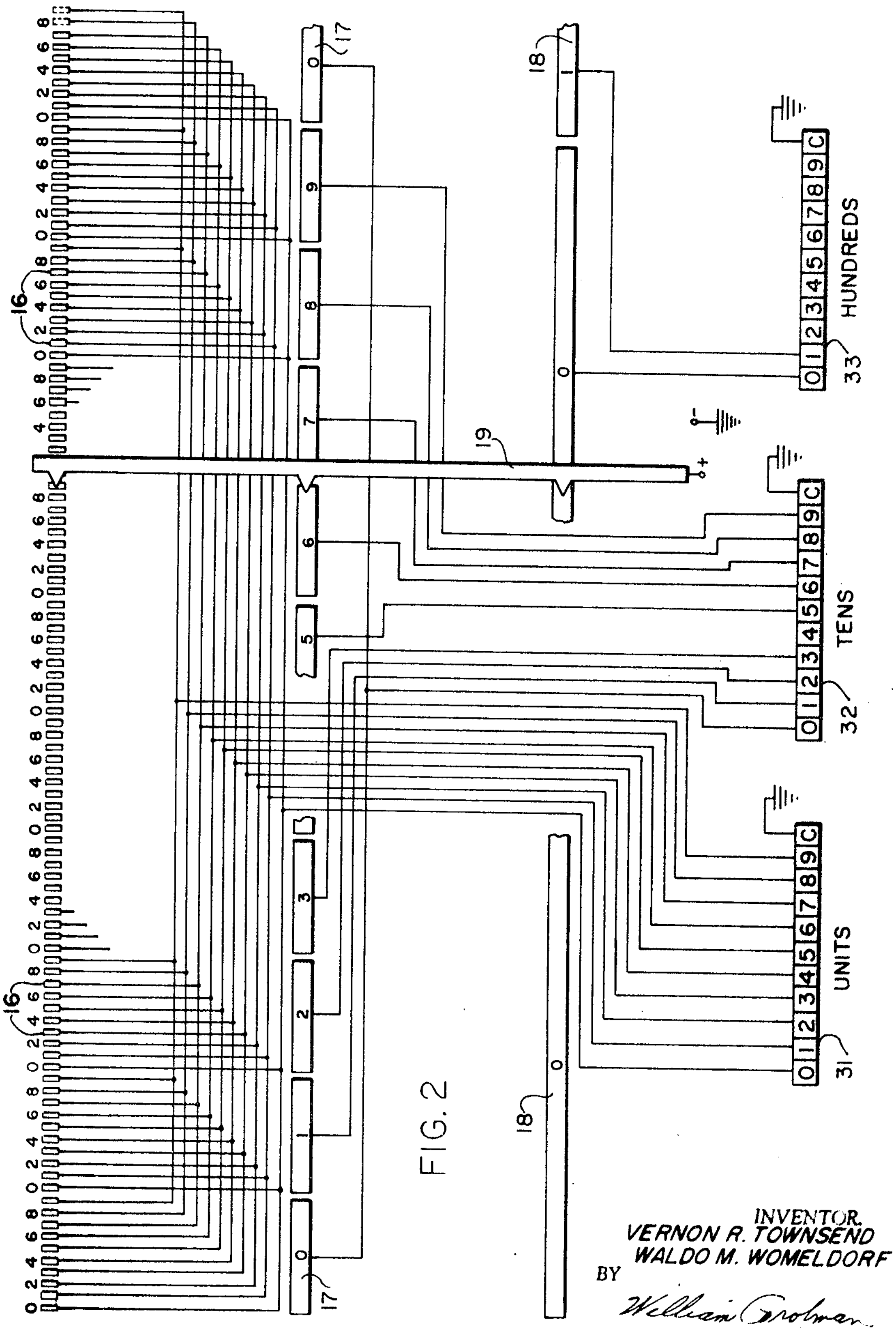
FIG. 2 is a detailed view of a portion of the circuitry of the apparatus of FIG. 1.

For a clearer understanding of the manner in which the electrical contacts cooperate with the fingers and the indicators, reference is made to FIG. 2. FIG. 2 illustrates a portion of the contacts 16, 17, and 18 mounted on the table 11, of the fingers 19, and of the electrical indicators 31, 32, and 33. In order to present a clearer picture, the bank of contacts 16, 17, and 18 have been greatly expanded so that only a portion of those contacts are shown in the drawings. The structure shown in FIG. 2 is by way of example only, and since the contacts 22 and 23 are essentially identical to the arrangement of contacts 16, 17, and 18, FIG. 2 and its description should suffice as a description of the entire electrical system. Two electrical contacts 18 are shown in FIG. 2, both of which are shown in part only. For each electrical contact 18, ten electrical contacts 17 are required, most of which are shown, and for each electrical contact 17, ten electrical contacts 16 are required. Three banks of electrical indicators 31, 32, and 33 are shown at the bottom of the page of the drawing. Each of the three banks of the electrical indicators contains ten separate indicators as shown, although any suitable 10-character device could be used. Let it be assumed for this discussion that each of the three indicators 31, 32, and 33 comprises a separate electrically illuminated symbol, one for each of the digits 0–9. The bank of indicators 31 represents units, the bank 32 represents tens, and the bank 33 represents hundreds. If it is assumed that not more than 199 coordinates in any direction will be required, then as shown in FIG. 1, only two hundreds contacts 18 will be necessary. For each additional 100 coordinate lines, one additional contact 18 will be required. The contact 18 to the left on FIG. 2, shown broken to permit wires to be shown therethrough, is connected to the symbol zero in the bank of indicators 33. The contact 18 to the right, only a portion of which is shown in FIG. 2, is connected to the symbol one in the bank 33. No other contacts 18 are shown. As mentioned above, for each contact 18 there are ten contacts 17. Starting at the left-hand edge of the drawing, the first ten contacts 17 are positionally arranged opposite the signal "0" contact 18. The contact 17 to the left is connected to the zero symbol in the bank 32, the next contact 17 to the right is connected to the symbol one in the bank 32, and so forth, with the tenth contact 17 from the left being connected to the nine symbol in the bank 32. In addition, in FIG. 2 there is shown a portion of another contact 17 adjacent a second contact 18. This eleventh contact 17 is the first in the next decade of contacts and connected to the same zero symbol that the first contact 17 was connected to. Also, as mentioned above, for each contact 17 there are ten contacts 16 and these are shown along the upper edge of FIG. 2. The connection of the contacts 16 are similar to the connection of the contacts 17. The contact 16 to the far left is connected to the zero symbol on the bank 31, with the next contact connected to the one symbol, and the following contact connected to the two symbol, etc., in the bank 31 as were the first ten contacts 16. This pattern on all three sets of contacts is represented. In addition, the other side of each of the illuminating means in the banks 31, 32, and 33 are connected together to a common line which is grounded.

The three brushes or fingers 19 are connected to one side of a source of electrical energy, the other side of which is grounded.

Referring to both FIG. 1 and FIG. 2, as the carriage 13 is moved, the fingers or brushes 19 pass over the various contacts 16, 17, and 18. At any instant the three brushes 19 touch a single contact 16, a single contact 17, and a single contact 18. Assume the position of the brushes 19 as shown in FIG. 2. In that position current flows from the source of electrical energy through the three brushes 19 to the contact 16, through a symbol to which it is connected to illuminate that symbol and then to ground. Similarily, electrical energy flowing through the other two brushes 17 and 18 and through the symbol to which they are connected. As shown on FIG. 2 the symbol "9" in the bank 31, the symbol "6" in the bank 32, and the symbol "0" in the bank 33 will be illuminated. In this manner the pointer 24 would be indicating a Y coordinate which the illuminated symbols in indicators 31, 32, and 33 would show as "069." Should the pointer 24 and the carriage 13 be moved a short distance to the right, the indicators 31 and 32 would change, showing that the pointer 24 is now located in a vertical coordinate 070. Should the carriage 13 move one space to the left, then only indicator 31 would change showing that the pointer 24 is now located at Y coordinate 068. The arrangement of the contacts 21 and 22 and the brushes 23, which are mounted one above the other, is essentially the same as that shown on FIG. 2, except that these contacts are vertical instead of horizontal. However, the construction and operation of the X coordinate indicators are the same as that of the Y coordinate indicators.

Although the apparatus has been described in some detail above, its manner of use might be explained with a simple example. Assume that the surface 12 is a panel or support for a large number of printed circuit board sockets and that each intersection of a X and a Y coordinate represents a terminal to be wired. Further assume that there are also 200 vertical columns of these contacts and 100 horizontal rows providing for a maximum of 20,000 terminals. Panels with similar printed circuit card sockets are often used in computers and similar complex electronic equipment. The particular terminal for each particular circuit card has, previous to the wiring to the backplane, been identified on drawings, has been numbered, and the terminal to which it has been connected has been identified. This information is available in the design of the equipment and is made available in any suitable form to the individual who is wiring the panel. Individual wires in a system of this nature are often bound together into cables which may connect one portion of the apparatus with another. In any case, the individual terminals will be identified by their coordinate addresses and the individual wires in the cable are suitably identified. The wiring list, chart, tab run, or other means used to convey information to the person doing the wiring, can identify the individual wire and the address of the terminal to which it is to be connected. A panel may well contain over a 1,000 of such terminals to be wired. The use of the apparatus of this invention quickly and accurately identifies, in the manner described above, each terminal whose address is known. The person wiring the panel can rapidly move from terminal to terminal and make the proper connection with accuracy.

The above specification has described a new and improved device for rapidly and accurately locating individual points on a surface. It is realized that this description may indicate to other skilled in this art additional ways in which the apparatus of this invention may be used without departing from its spirit. It is, therefore, intended that this invention be limited only by the scope of the appended claims.

What is claimed is:

1. Apparatus for locating desired points on a surface, said apparatus comprising a surface upon which points are to be located, a first carriage mounted for movement across said surface in a first direction, a second carriage mounted on said first carriage for movement across said surface in a second direction, a pointer mounted on said second carriage to indicate a designated point on said surface, a first set of electrical contacts mounted on said surface, first brush means mounted on said first carriage for movement with said first carriage in contact with said first set of electrical contacts, a second set of electrical contacts mounted on said first carriage for movement therewith, second brush means mounted on said second carriage in contact with said second set of electrical contacts to move with said second carriage across said second set of contacts, each of said first and second sets of contacts comprising at least a first row of *n* contacts equally spaced and at least a second row having a group of *m* contacts for each of said *n* contacts of said first row, said *n* contacts having adjacent to and associated with it each of one of said groups of *m* contacts so that each of said first and second brush means simultaneously scans one *n* contact and a group of *m* contacts as said carriages are moved, means for connecting said first and second brush means to a source of electrical energy, and a display system comprising one set of display elements for each of said first and second sets of contacts, each of said display sets including a group of *m* display elements for each of said rows of contacts, means for connecting said individual contacts to individual display elements, and means for connecting said individual display elements to said source of electrical energy so that said display elements display the location of the point on said surface indicated by said pointer.

2. The apparatus defined in claim 1 wherein said display elements are lamps which are lit when the appropriate contact is touched by a brush, and further including means for applying electrical energy to the series arrangement of a display element, a contact and a brush.

3. The apparatus defined in claim 1 wherein *n* is at least two and wherein *m* is 10.

* * * * *